Nov. 6, 1923.
R. P. GREENLEAF
LOADING MACHINE
Filed July 2, 1921
1,473,227
3 Sheets-Sheet 1
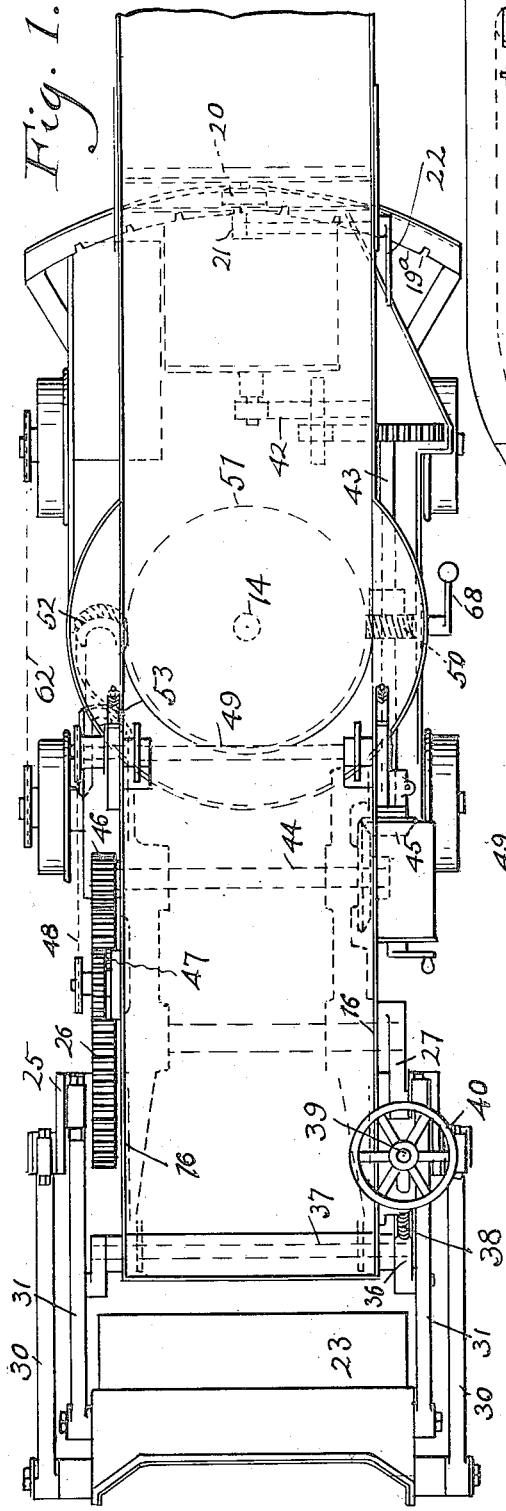
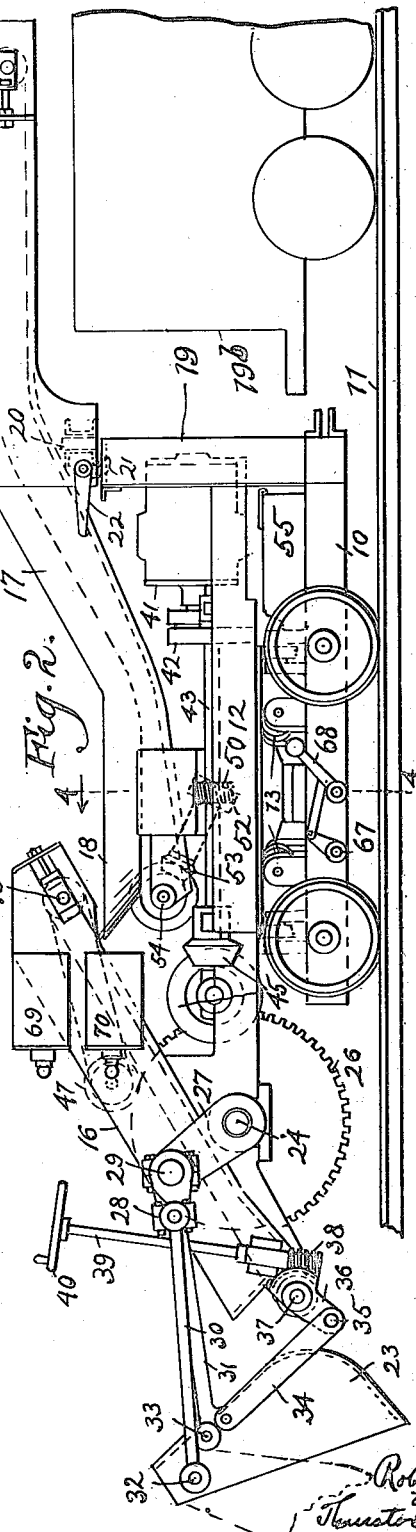
Inventor
Robert P. Greenley
by
Hunter Kent Hudson
Attys.

Nov. 6, 1923.

R. P. GREENLEAF

LOADING MACHINE.

Filed July 2, 1921

1,473,227

3 Sheets-Sheet 2

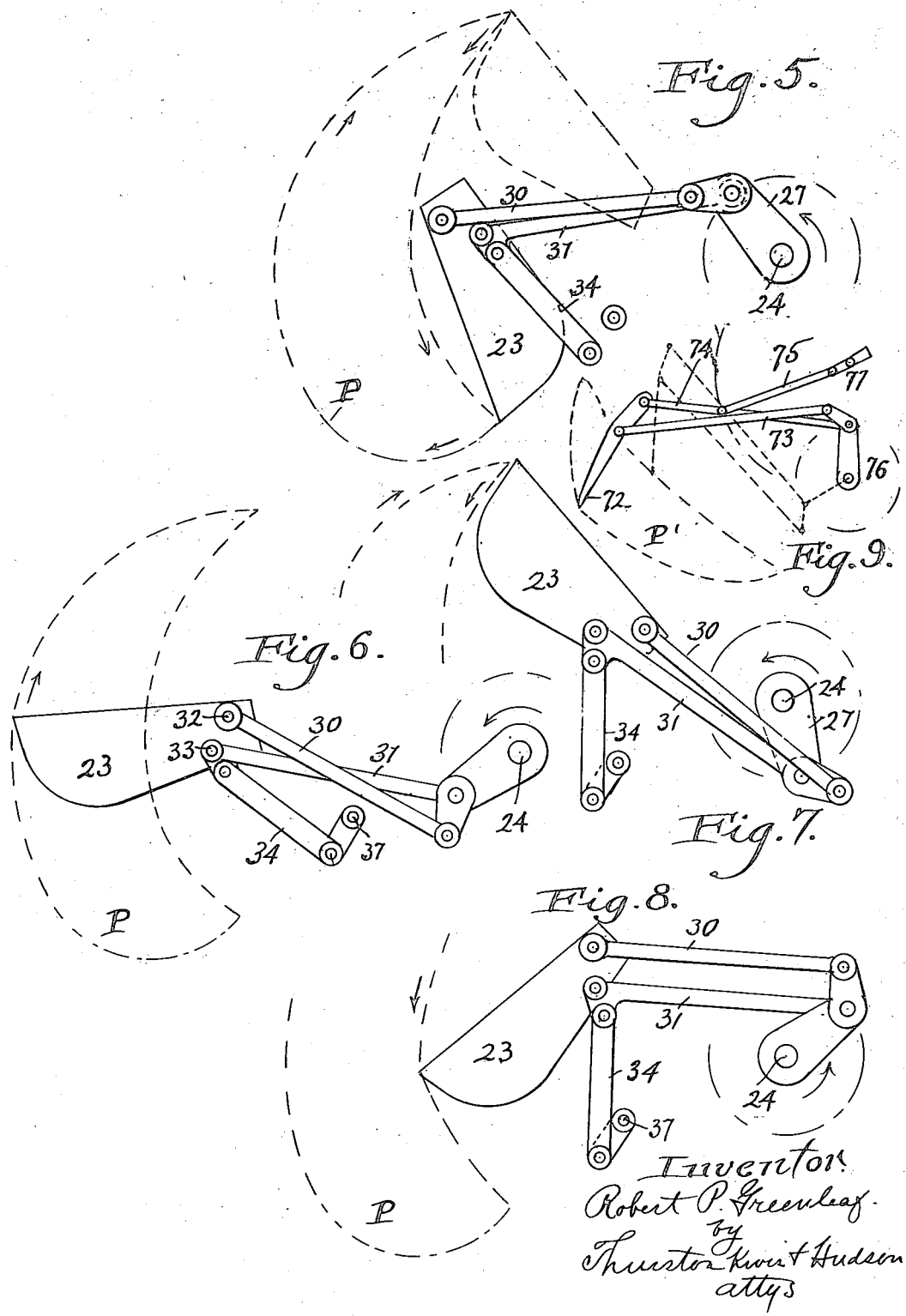

Patented Nov. 6, 1923.

1,473,227

UNITED STATES PATENT OFFICE.

ROBERT P. GREENLEAF, OF CLEVELAND, OHIO, ASSIGNOR TO FRANK BILLINGS, OF CLEVELAND, OHIO.

LOADING MACHINE.

Application filed July 2, 1921. Serial No. 482,081.

*To all whom it may concern:*

Be it known that I, ROBERT P. GREENLEAF, a citizen of the United States, residing at Cleveland, in the county of Cuyahoga and State of Ohio, have invented a certain new and useful Improvement in Loading Machines, of which the following is a full, clear, and exact description.

This invention relates to certain improvements in loading machines of the type wherein material is moved from the ground to a conveyor or other receiving part by a material moving element, such as a shovel or hoe, and the invention relates particularly to the mechanism for operating the material moving element.

More especially, the invention relates to an operating mechanism for that type of machine wherein the material moving element is moved substantially continuously through repeated cycles of a closed path of movement by continuously operating driving means as distinguished from a machine wherein movements are imparted intermittently or at will of the operator through one or more manually controlled motors.

The principal object of the invention is to provide an operating mechanism which is efficient and simple in construction, which imparts the desired movements to the digging or conveying element so that the material being handled may be effectively transported to the conveyor or other receiving means, and which contains no sliding or guided parts, but on the other hand, simply pivotal, or pivotally connected parts whose bearings are substantially free from fouling by dirt and the like.

The invention may be briefly summarized as consisting in certain novel details of construction, and combinations and arrangements of parts which will be described in the specification and set forth in the appended claims.

Figure 3:
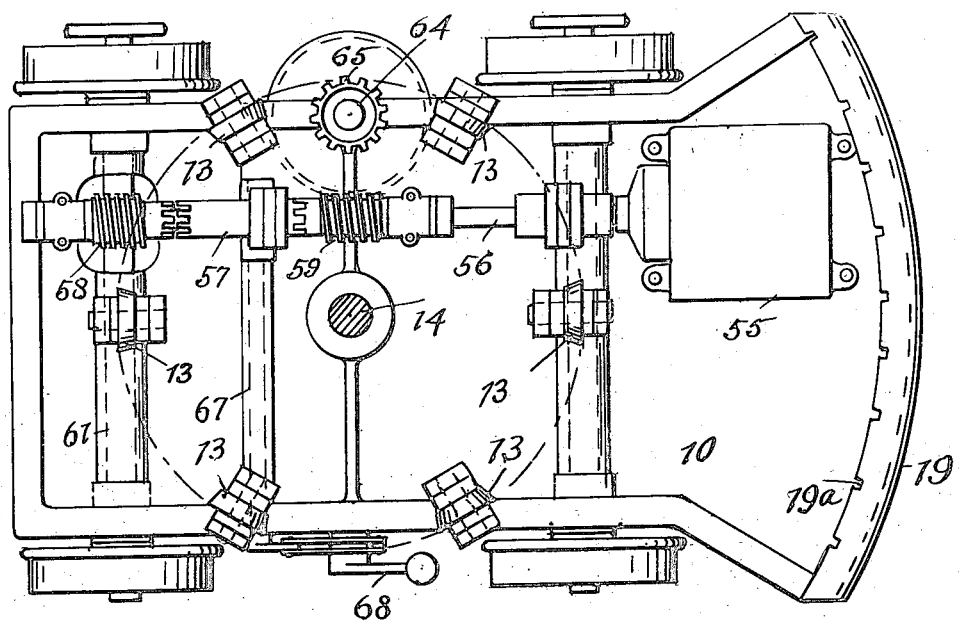
Figure 4:
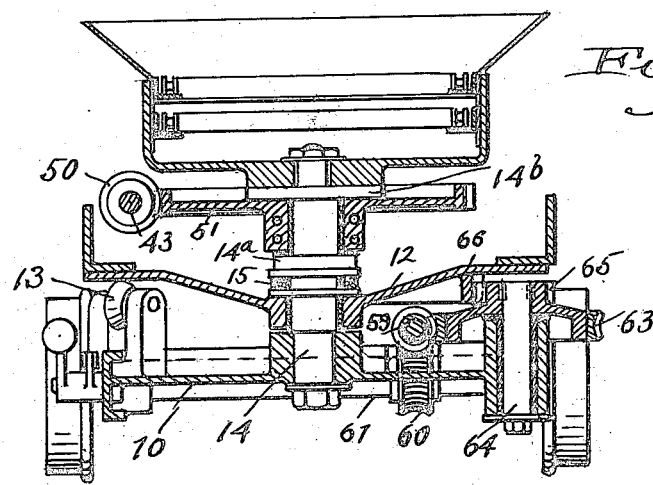

In the accompanying sheets of drawings, wherein I have shown an embodiment of the invention which operates effectively, Fig. 1 is a top plan view, and Fig. 2 is a side view of one form of loading machine to which my invention is applied; Fig. 3 is a top plan view of the truck with the superstructure removed; Fig. 4 is a transverse sectional view substantially along the line 4—4 of Fig. 2, looking in the direction indicated by the arrow; Figs. 5, 6, 7 and 8 are diagrammatic views of the material moving element here shown in the form of a shovel, and of the operating mechanism therefor, the parts being shown in different positions; and Fig. 9 is a similar view showing the same mechanism applied to a material moving element in the form of a hoe.

The structure and frame work of the machine, the conveyor or conveyors and the operating mechanism therefor may assume any suitable form which may be other than here shown, but in this instance the machine includes a wheeled truck 10 adapted to travel along rails 11 which may be laid upon the floor of a mine, the present machine being especially adapted for use in mines particularly for loading coal. Supported on this truck is a superstructure including a frame or turntable 12 carrying the principal parts of the machine. The turntable 12 is supported from the truck through the medium of rollers 13 which support the load of the superstructure and permit the latter to turn about a pivoting king bolt 14, which as shown in Fig. 4 has its lower portion secured in vertical position to a central point of the frame of the truck, this king bolt serving to resist the thrust in a vertical direction through the medium of an annular ball thrust bearing 15 which is between the center of the turntable frame and the flange 14$^a$ of the king bolt, as clearly shown in Fig. 4. The upper part of the king bolt projects upwardly above this flange and supports or centralizes other parts to be referred to.

In this instance the machine is provided with two conveyors carried by or forming a part of the superstructure including a front conveyor 16 supported in an inclined position at the front end of the machine and adapted to discharge into a rear conveyor designated generally by the reference character 17, the front part of the conveyor frame having a hopper shape indicated at 18. This rear conveyor 17 which extends from a point just beneath the discharge end of the front conveyor rearwardly beyond the turntable 12 and truck 10, and has its rear end elevated so that a mine car such as indicated at 19$^a$ may be run beneath the rear elevated end so as to receive the material which is conveyed rearwardly and discharged from the rear end of the conveyor 17.

It is sometimes desirable that the rear conveyor discharge to one side of the axis of the machine, as when the machine is positioned on the curve of a track, or when it is desired to load cars on a track alongside that on which the machine is operating, and to that end the front part of the frame of the conveyor 17 is pivoted to swing about the axis of the king bolt 14, the upper part of the king bolt as shown in Fig. 4, passing through the bottom of the frame of the conveyor 17, preferably coaxially of the hopper 18, the conveyor frame resting upon a second flange 14$^b$ on the king bolt near the upper end of the latter. The rear portion of the conveyor 17 is supported by an upright extension 19 at the rear end of the frame of truck 10, and in this instance the top of this upright extension 19 is in the form of a track which is engaged by a roller 20 on the lower side of the conveyor frame, as shown in Figs. 1 and 2. Provision is made for locking the rear conveyor in any adjusted position to which it may be moved, preferably by hand, and this locking means in this case consists of a series of notches 19$^a$ in a curved angle or equivalent member of the extension 19, together with a latch 21 which is carried by the conveyor frame, this latch being mounted on a shaft extending laterally to one side of the conveyor frame, and adapted to be swung by a lever 22 so as to move the latch 21 into or out of any particular notch 19$^a$. As the chief features of the invention do not reside in the details of the frame or conveyor structure, further description of the latter is believed to be unnecessary, although the manner in which the working parts are operated, will be later described.

At the front of the machine a suitable form of material moving element is provided, and in Figs. 1 to 8 I have shown this element in the form of a shovel 23, the means for supporting and operating which, constitutes an important feature of the invention. This shovel has a curved bottom and rear wall, and two parallel or substantially parallel sides. The front and rear ends of the shovel are open so that the material can be scooped up in the usual fashion, and when the shovel is elevated and tilted, the material may discharge from the shovel by sliding out of its rear end onto the conveyor 16.

Motion is derived for moving the shovel substantially continuously through repeated cycles or closed paths of movement from a rotating shaft 24 supported at the front end of the frame 12. At each end of this shaft there is what may be termed a double crank. One double crank is shown at the upper part of Fig. 1, at 25, this being formed in part from a fairly large driving gear 26 keyed to the shaft. The other double crank is shown at 27. Each of these double cranks has two wrist pins 28 and 29, the wrist pin 28 being offset laterally from the pin 29, and also being offset from the pin 29 in the respect that it is somewhat further from the center of rotation and is in advance of pin 29, as clearly shown in Fig. 2 and in Figs. 5 to 8. To these wrist pins 28 and 29 on both sides of the machine are connected two pairs of rods or links 30 and 31 which at their outer ends are pivotally connected at 32 and 33 respectively, to the sides of the shovel near the rear end thereof. The location of these rods or links and the pivotal connections at their ends are such that they swing in parallel planes, and can clear one another in their movements, this being necessary as the rods assume various relative positions during the complete cycle of movement of the shovel.

Additionally, I provide for the purpose of supporting and controlling the movement of the shovel a pair of movement controlling members here shown in the form of pivoted arms 34, one provided on each side of the shovel. Each arm 34 is pivotally connected at its upper end to the shovel or to the arm 30 at or adjacent the pivotal point 33, and in this instance the lower ends of the two arms 34 are pivotally connected to pins 35 of crank arms 36 secured to the ends of a shaft 37, the position of which may be adjusted by worm and worm wheel gearing 38 and an upstanding shaft 39 having a hand wheel 40. The shaft 37, arms 36, and pins 35 to which the arms 34 are connected, are normally stationary, and these parts are adjusted only when it is desired to vary the digging depth.

Referring to Figs. 5 to 8 it will be observed that in one complete rotation of the double cranks at the ends of the operating shaft 24, the shovel is given a substantially continuous motion during which the shovel is filled by being given a forward and upward scooping action, is then elevated and tilted so that the material may slide out the rear open end onto the front conveyor, and is again lowered to digging position. It will be observed also from these figures that the digging edge of the shovel is moved through a closed, upright, cresent shaped path, designated P, the lower part of the described figure or path being relatively broad and substantially flat, as is desirable in scooping up loosened material lying in a pile.

In Fig. 5 the parts are shown in a position corresponding to the start of the digging or scooping part of the movement. In Fig. 6 the shovel is substantially half elevated. In Fig. 7 the shovel is at substantially the end of the dumping part of the movement, and in Fig. 8 the shovel is at about the three-quarters point of the cycle, i. e., with the shovel about midway between the discharge point and beginning of the digging stroke or start of the next cycle.

These figures illustrate some of the various relative positions that the links or rods 30 and 31 assume as the shovel is making one complete cycle of movement, Figs. 5 and 7 showing that the links or rods are in substantial alignment, Fig. 6 showing them crossed, and Fig. 8 in substantial parallelism.

An important point to be noted is that during the early part of the cycle of movement, i. e., during the major portion of the filling part of the movement, the double cranks 25 and 27 and the links or rods 30 and 31 have the equivalent of a toggle action which gives the shovel a very powerful filling movement, and while the shovel is being filled and is therefore passing through the material, it is moved relatively slowly for a certain increment of movement of the rotating cranks, and after the shovel emerges from the material it is given a more rapid movement and a much greater movement for the same increment of movement of the cranks. Furthermore, as the shovel reaches its full discharging position its rotating movement is substantially slowed down. In other words, the mechanism which I have provided is admirably adapted for this purpose, inasmuch as while the cranks move continuously at the same speed, the shovel is given a powerful relatively slow digging motion, and relatively fast swinging motion to dumping position, and then a relatively slow motion as the material is discharged from the shovel onto the conveyor.

It will be seen, particularly by reference to Figs. 5 to 8, that as the double cranks rotate, that the links or rods 30 and 31 alternately become tension or pulling members and compression or pushing members, the chief function of which is to tilt or rotate the shovel, and that the chief function of the arms 34 is to control the elevating and lowering of the digging edge of the shovel as these arms are swung from inclined to upright position and vice versa. It is to be understood, however, that the arms 34 and links or rods 30 and 31 co-operate and contribute both to the swinging and to the vertical motion of the shovel.

The shaft 24 may be rotated in different ways, but in this instance I provide at the rear end of the turntable frame 12 a motor 41, which through gearing indicated at 42, (see Figs. 1 and 2) drives a shaft 43, extending forwardly along one side of the turntable frame 12. The forward end of this shaft drives a cross shaft 44 through the medium of bevel gearing 45, and this cross shaft is provided with a pinion 46 which engages the gear 26, and rotates it continuously while the motor 41 is in operation.

The traveling member of the front conveyor 16 may be driven in different ways, but in this instance by a pinion 47 connected by sprockets and a chain indicated by the reference character 48 to the upper conveyor shaft 49.

The traveling member of the rear conveyor is in this instance operated from the shaft 43, and to this end this shaft is provided about midway of its ends with a spiral gear 50 (see Figs. 2 and 4), which engages and rotates a comparatively large spiral gear 51, mounted beneath the hopper end of the frame of conveyor 17 and freely rotatable on the king bolt 14 (see Fig. 4) between the flanges 14ª and 14ᵇ thereof. The gear 51 drives a second spiral gear 52 located diametrically opposite from the spiral gear 50. This spiral gear is mounted on a short diagonally disposed shaft which is connected by worm and worm wheel gearing 53 to the transverse conveyor shaft 54 at the lower front end of the conveyor 17.

As already stated, the conveyors 16 and 17 may assume different forms, and this is true particularly of the traveling elements thereof. The latter may be in the form of endless belts or traveling members of the scraper variety which scrape the material up inclined floors of the conveyor frames, and this type of traveling conveyor element is contemplated by me. It will be observed that the traveling elements of the conveyors are indicated by the dotted lines in Fig. 2, but are omitted from Fig. 1 for the sake of clearness.

Before reverting again to the shovel and its operating mechanism, it might be stated that I provide on the truck a motor 55 (see Figs. 2 and 3) for propelling the machine along the track 11 and for turning the turntable. This motor 55, as shown in Fig. 3, drives a shaft 56 to which is keyed a sliding clutch element 57 designed to be separately clutched to a pair of worm gears 58 and 59, the former adapted to drive a worm wheel 60 on one of the truck axles 61. The front and rear truck axles are preferably connected together by chain and sprocket gearing shown at 62 in Fig. 1. The other worm 59 on shaft 56 is designed to rotate a worm wheel 63 on a short upright shaft 64 at one side of the truck, (see Figs. 3 and 4), this shaft having at its upper end a pinion 65 adapted to engage a gear segment 66 on the lower side of the turntable frame 12. Obviously when the cutch 57 shown in Fig. 3 is thrown forwardly, the motor 55 will cause the entire machine to be propelled along the track, and when the clutch element 57 is thrown rearwardly the motor 55 may be utilized to turn the superstructure on the truck frame, so that material at either side of the machine may be scooped up and delivered to the front conveyor. This clutch 57 is preferably operated from one side of the machine by means of a transverse clutch operating shaft 67 to which is connected a weighted clutch operating member 68 adapted to hold the clutch in either of its operative positions.

The motors 41 and 55 may be of any suitable type, but in this instance electric motors are contemplated, and to that end I have provided at one side of the machine, within reach of the operator, and in this instance on one side of the frame of the front conveyor 16, a pair of controllers 69 and 70, each adapted to control the operation of one of the motors.

I do not wish the movement imparting mechanism above described to be limited in its field of use to a material moving element in the form of a shovel, for with a modified arrangement of the parts, the same mechanism may be used advantageously for the actuation of a hoe for scraping material up to and onto the lower front end of the conveyor, and in Fig. 9 this adaptation of the invention is illustrated in a conventional or diagrammatic manner. In this figure the hoe which is shown at 72 is moved through a crescent-shaped path designated P' by mechanism including links or connecting rods 73 and 74 corresponding to the links or connecting rods 30 and 31 of the first described construction, and by a movement controlling arm 75 corresponding to the arm 34 of the first described construction, together with a double crank designated 76. As here shown, the forward ends of the links or rods 73 and 74 are pivotally connected to the hoe near its upper end at points one above the other, and their rear ends are connected to the crank pins of the double crank, and the arm 75 has its forward end pivotally connected to the arm 74 and its rear end pivotally connected to a suitably supported fixed center 77. It will be understood that preferably the mechanism here shown will be duplicated on both sides of the machine, i. e., one set of such operating parts being provided for one side of the hoe, and a similar set for the opposite side.

Having described my invention, I claim:—

1. In a loading machine, a material moving element, means for moving the same through a closed path of movement comprising a rotating double crank, links connecting the same to the material moving element at spaced points, and a movement controlling member co-operating therewith.

2. In a loading machine, a material moving element, means for moving the same substantially continuously through a closed path or cycle of movement comprising a rotating member having a pair of relatively offset crank pins, a pair of arms connecting the crank pins to different points of the element, and movement controlling means engaging one of said arms.

3. In a loading machine, a material moving element, means for giving it a substantially continuous movement through a closed path comprising a rotating crank, a pair of arms connected to the crank at relatively offset points and connected to the element at relatively offset points, and a movement controlling member for holding the links to a fixed path of movement.

4. In a loading machine, a material moving element, means for giving it a substantially continuous movement through a closed path comprising a rotating crank, a pair of arms connected to the crank at relatively offset points and connected to the element at relatively offset points, and a movement controlling arm operatively connected to the element and to a stationary center.

5. In a loading machine, a material moving element, means for giving it a substantially continuous movement through a closed path comprising a pair of rotating cranks and two sets of arms, both sets operatively connected to the element and one set connected at offset points to one crank, and the other connected at offset points to the element, and movement controlling means associated therewith.

6. In a loading machine, a shovel, means for moving the shovel substantially continuously through a closed path, comprising a rotating shaft, a pair of cranks thereon, two pairs of arms, the arms of each pair being connected at offset points to one crank and connected to offset points of the element, movement controlling swinging arms connected to fixed centers and operatively associated with the two pairs of arms.

7. In a loading machine, a material moving element, actuating means for giving it a substantially continuous movement through a closed path comprising a pair of arms operatively connected to the element at relatively offset points, rotating means for moving said arms and to which said arms are connected at offset points, and movement controlling means operatively associated with the element.

8. In a loading machine, a shovel, means for giving it a substantially continuous movement through a closed path so as to scoop up material during a portion of the movement and discharge the material during another portion, comprising a pair of arms connected to the shovel at relatively offset points, rotating means for actuating said arms and to which said arms are connected at offset points, and movement controlling means operatively associated with the shovel.

9. In a loading machine, a shovel, means for giving the same a substantially continuous movement through a closed path, said means comprising two sets of arms each set connected to the shovel at relatively offset points, rotating means for actuating said arms and to which the arms of each set are connected at relatively offset crank points, and movement controlling means co-operating with said arms.

10. In a loading machine, a shovel, means for giving the same a substantially continuous movement through a closed path, said means comprising two sets of arms each set connected to the shovel at relatively offset points, rotating means for actuating said arms and to which the arms of each set are connected at relatively offset crank points, and a pair of movement controlling arms pivoted to swing about fixed centers, and each associated with one of the said sets of arms.

In testimony whereof, I hereunto affix my signature.

ROBERT P. GREENLEAF.